Patented Oct. 13, 1925.

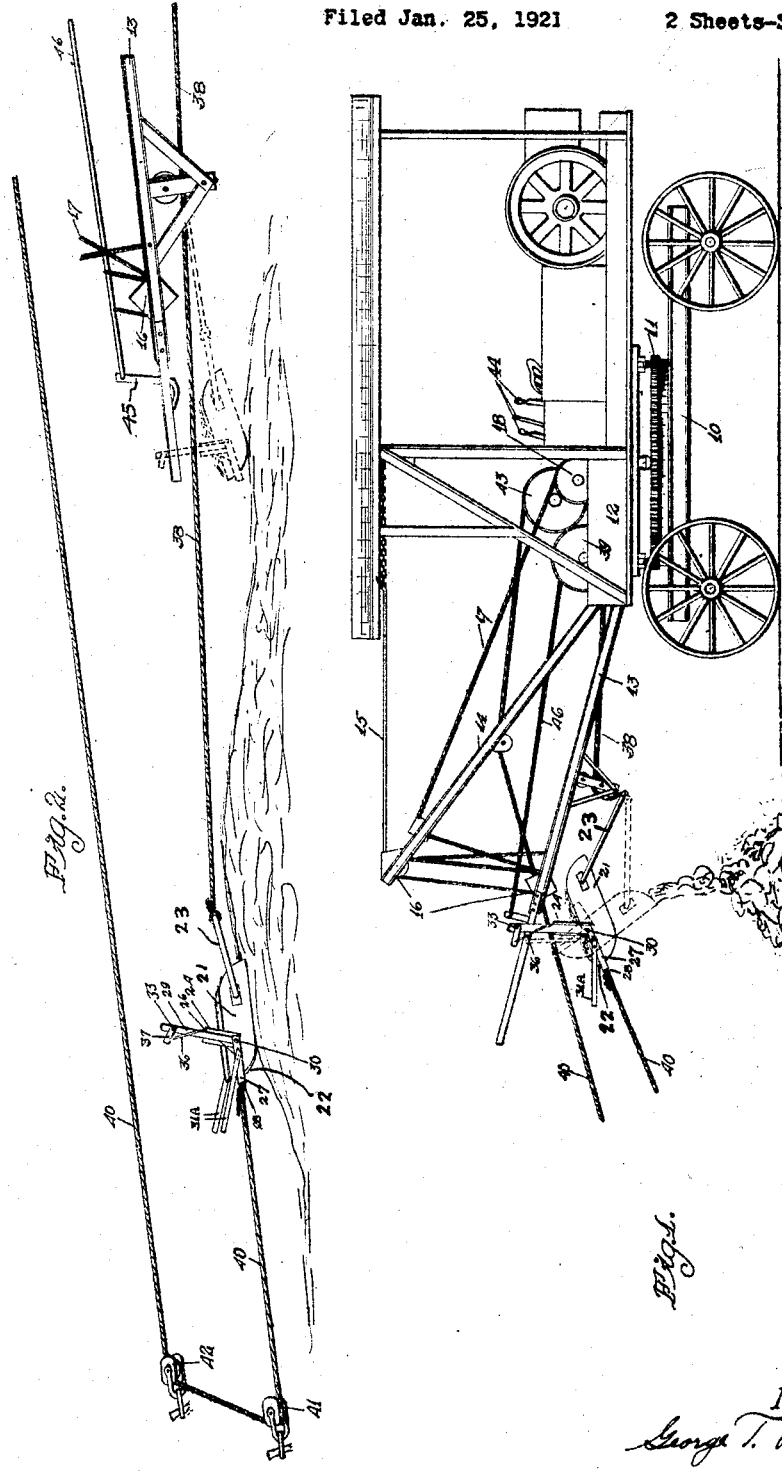

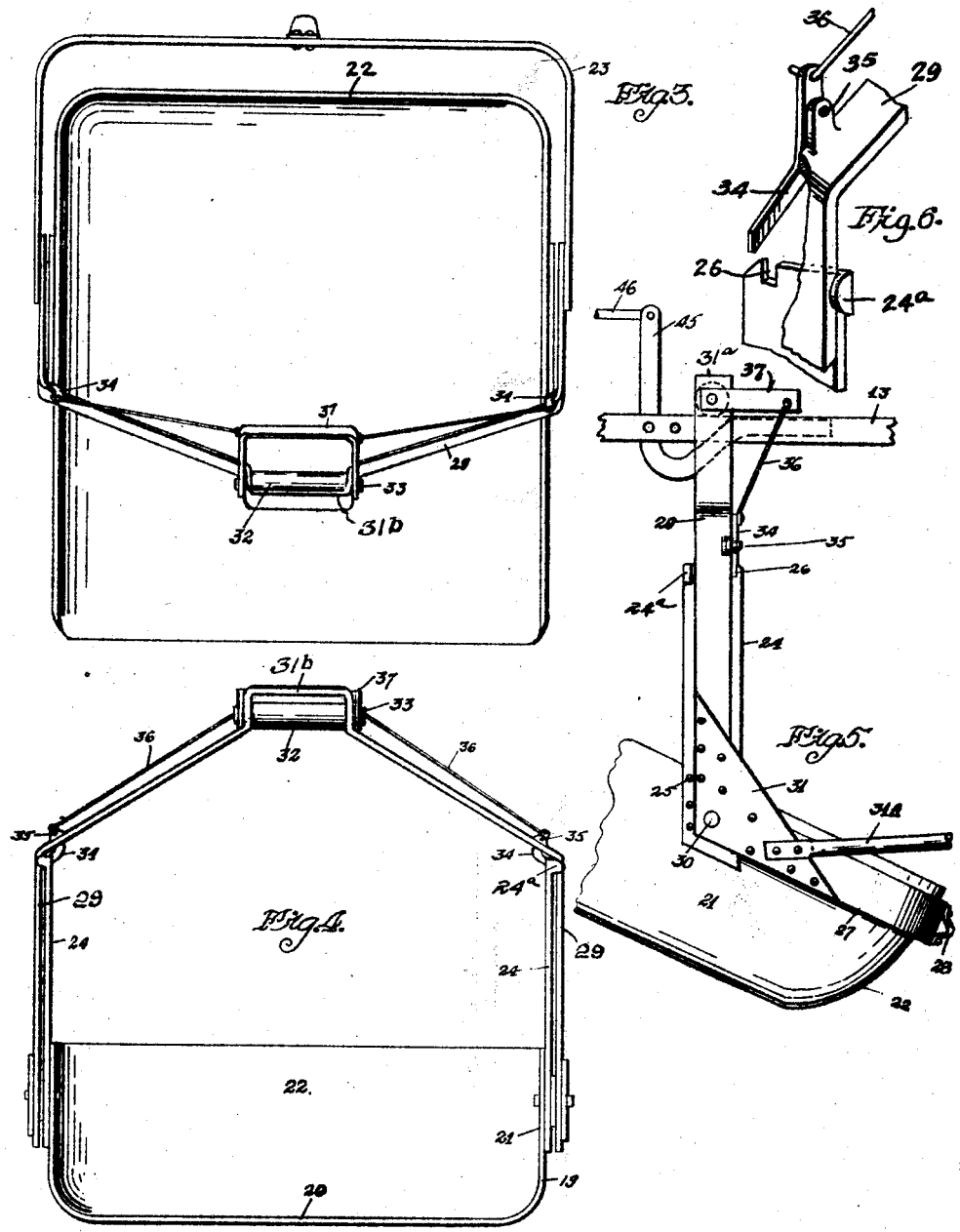

1,556,959

UNITED STATES PATENT OFFICE.

GEORGE T. RONK, OF FAIRFIELD, IOWA.

SCRAPER.

Application filed January 25, 1921. Serial No. 439,855.

*To all whom it may concern:*

Be it known that I, GEORGE T. RONK, a citizen of the United States, and resident of Fairfield, in the county of Jefferson and State of Iowa, have invented a certain new and useful Improved Scraper, of which the following is a specification.

The object of my invention is to provide a new and improved scraper or scoop of simple, durable and inexpensive construction, especially adapted to be used in connection with an excavating and drag filling machine similar to the one described in my copending application, filed January 11, 1922, Serial Number 528,587.

More specifically it is my object to provide in a transportable scraper or scoop for handling dirt, gravel and similar materials, improved means for lifting the scoop and dumping the material therefrom.

These and other objects, which need not be mentioned in detail, will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved scraper, and also a diagrammatic view of the mechanism for controlling the same.

Figure 2 is an enlarged, detail, diagrammatic view, showing the method in which my improved scraper is operated.

Figure 3 is a plan view of my improved scraper.

Figure 4 is an end elevation of the same; and

Figure 5 is an enlarged, detail, side elevation, showing a portion of the scoop broken away and a segment of the lifting arm in operative position with the scoop.

Figure 6 is an enlarged detail segmental view showing the scoop locking mechanism, a portion of the supporting bail being broken away.

Figure 1 of the drawings shows a general view of my improved excavating machine, which is similar to the one illustrated in my copending application above referred to, and consists generally of a truck 10, provided with a turn-table 11, on which is mounted a frame 12.

The frame 12 is provided with a pivoted boom 13, and also with a pivoted boom 14. The boom 14 is held at an inclined position by means of a rod 15, while the boom 13 is movably connected, with respect to the boom 14, by means of a block and tackle 16. The haul member 17 of the tackle is designed to be operated by means of a drum 18, the drum 18 in turn being operated by mechanism not shown in detail.

By rotating the drum 18 in one direction the outer end of the boom 13 may be elevated, and then by rotating the drum in the opposite direction the said outer end may be lowered, and the free end of said boom may be moved in a circular path by rotating the frame 12 on the turn-table 11.

My improved scraper comprises a scoop member 19, having a bottom 20, sides 21 and back 22. I have provided a bail 23 which is pivoted to the sides 21 at a point near their forward and lower ends. This bail 23 is for the purpose of pulling the scoop member forward through the material to be loaded, and to a position where it may be elevated.

Each of the members 21 is provided with an upwardly and forwardly extending locking plate 24, which is rigidly secured in position by means of rivets 25. The upper end of each plate 24 is provided with a notch 26 near the back edge of said plate, as clearly shown in Figures 5 and 6. The plates 24 are riveted to the sides 21 at a point slightly back of the center of gravity of the scoop, and slightly inclined from the perpendicular to the bottom member.

Pivotally secured to the lower ends of the plates 24 is a bail member 27, designed to extend around the back of the scoop and provided with a loop 28 to which a cable may be attached for returning the scoop to a position to be filled.

For lifting the scoop I have provided a bail 29, having its lower ends pivoted at the same point where the member 27 is pivoted, by means of a pivot 30, and the two members 29 and 27 are rigidly secured in position relative to each other by means of a plate 31. The pivot 30 is placed at a position near the top edges of the members 21. The member 27 is designed to normally rest parallel with the bottom member 20, while the member 29 is placed at an angle slightly ahead of the perpendicular, relative to said member 27.

The upper central portion of the bail 29 is provided with a U-shaped portion 31$^b$, designed to receive a roller 32 rotatably mounted on a shaft 33. This roller is for the purpose of supporting the bail and scoop when in elevated position.

By this construction it will be seen that when the member 29 is supported, as illustrated in Figure 5, the scoop will be free to oscillate, so that the bottom 20 may assume a vertical or a horizontal position.

To lock the scoop in a predetermined position relative to the member 29, I have provided a pawl 34 pivoted to the member 29 by means of pivots 35. One end of each pawl 34 is designed to enter its respective notch 26, while the opposite end is designed to receive an operating rod 36. Each of the rods 36 is pivotally connected to the side members of a U-shaped bar 37, the forward ends of said side members being pivotally mounted on the shaft 33. The pawls 34 have the shape of bell crank levers, and when connected as just described, and the member 37 is a horizontal position, and the member 24 is in a vertical position, the weight of the member 37 will cause the pawls 34 to enter and rest in the notches 26, and when they are so placed the bottom of the scoop 20 will assume an inclined position with the forward end of the scoop elevated. This is the correct position for carrying the scoop when it is filled.

It will be seen that if the scoop is filled with material and supported as shown in Figure 5, if the member 37 is elevated the pawls 34 will disengage the notches 26, permitting the member 24 to swing forwardly and the bottom 20 to assume a vertical position, which will cause the scoop to be emptied.

Secured to each of the plates 31 is a handle 31$^a$. These handles are for the purpose of manipulating the scraper while it is being filled.

Referring to Figure 2, the free end of the boom 13 is shown in its lowered position, and the scoop in a filling position. The bail 23 is provided with a cable 38, which passes to a drum 39 on the frame 12, while the loop 28 of the bail 27 is connected to a cable 40 which passes through pulleys 41 and 42 and thence to a drum 43 on the frame 12. The drums 18, 39 and 43 may be manually controlled by levers 44.

When the scraper has been moved to filling position, as shown in Figure 2, with the member 29 locked in position relative to the member 24, the drum 39 is rotated, causing the cable 38 to be drawn forward and the scraper filled. After the scraper has been filled, this forward movement is continued, and the free end of the boom 13 moved in line with the incoming cable 38. As the scraper is advanced, the free end of the boom 13 will enter the bail 29 at a position vertically below the roller 32. The boom may then be elevated, which will cause the scoop and the member 29 to be elevated. The boom may then be swung to any desired position, at which time the member 37 may be elevated by means of a pivoted bar 45 and a cable 46, the bar 45 having a portion lying parallel with the upper edge of the member 13. As the cable 46 is pulled the horizontal portion of the member 45 will be elevated, and will engage the lower edge of the member 37. This will cause the scoop to be dumped, as before described. The boom 13 will then be swung to a position substantially in line with the cable 40, and lowered. The scoop will engage the ground with the bottom in a horizontal position, while the member 29 will be swung backward, due to the weight of the bail 27. When the drum 43 is rotated the cable 40 will be moved, while a certain retarding motion will be imparted to the bail 23 through the cable 38 and the friction of the drum 39 as the cable is unwound. Due to the fact that the pivot of the bail 23 is nearer the lower edge of the side members, while the pivot of the bail 29 is nearer the upper edge, a slight rotary movement will be imparted to the scoop, causing the handles 31$^a$ to be elevated and the member 29 moved to a locking position relative to the member 24. The inertia of the upper end of the bail 29 also assists in bringing these two members to a locking position as the scoop is started backward. A lug 24$^a$ is provided to form a stop for the member 29 so that the latches 34 will be aligned with the notches 26. The scoop is then moved to position where it may again be filled.

By this arrangement I have provided means whereby a scoop may be mechanically moved to filling position, and when filled moved to a position where it may be elevated and carried to a point where it may be dumped.

By this construction it will be seen that I have provided a scraper of comparatively simple, durable and inexpensive construction, which is accurate in its operations and which is rigid, and which may be mechanically operated and controlled.

It will also be seen that when the scoop is held in its elevated position on the boom, the said scoop is rigidly held in such a manner that the vibration of the swinging motions caused by the supporting members will not move or dislodge the material therein.

I claim as my invention:

1. A scoop having a bottom, sides and a back, a bail pivoted to the forward lower ends of said sides, a returning bail, a lifting bail, said returning and lifting bails being formed integral, and pivoted near the upper edge of said side members and back of the center of gravity of said scoop member, means for locking said lifting and returning bails at a predetermined angle relative to the side members of said scoop, and means for releasing said locking means.

2. A scoop having a bottom, sides and a back, a bail pivoted to the forward lower ends of said sides, a returning bail, a lifting bail, said returning and lifting bails being formed integral, and pivoted near the upper edge of said side members and back of the center of gravity of said scoop member, means for locking said lifting and returning bails at a predetermined angle relative to the side members of said scoop, means for releasing said locking means, and handles secured to said returning bail.

3. A scoop having a bottom, sides and a back, a bail pivoted to the forward ends and lower edges of said sides, a locking plate for each of the side members inclined slightly forwardly from the perpendicular of the bottom, pivot members for the lower ends of said locking plate, a returning bail, a lifting bail, said returning and lifting bails being formed integral and mounted on said pivot members, means carried by said lifting bail for locking the said locking plate and said lifting bail together, and means carried by said lifting bail for releasing said locking means.

4. A scoop having a bottom, sides and a back, a bail pivoted to the forward ends and lower edges of said sides, a locking plate for each of said side members inclined slightly forwardly from the perpendicular of the bottom and having its outer end provided with a latch engaging notch, a lifting bail pivoted to the lower end of each of said locking plates, a locking device carried by said bail supported in operative position with the notch of said plate, a pivoted lever carried by the said lifting bail, and a link operatively connecting said pivoted lever and said locking means.

5. A scoop having a bottom, sides and a back, a bail pivoted to the forward ends and lower edges of said sides, a latch engaging plate supported from each of the side members and inclined slightly forwardly from a perpendicular line of the bottom, a U-shaped supporting bail having its ends pivotally secured to the lower end of said latching plate, a locking member for said bail, a substantially U-shaped lever pivoted to said bail, a link for operatively connecting said U-shaped lever and said locking member, the said latch plate being provided with a stop member for engaging one side of the U-shaped bail to limit the relative movement between the supporting bail and said latch plate in one direction.

GEORGE T. RONK.